(12) United States Patent
Rui

(10) Patent No.: US 11,933,449 B2
(45) Date of Patent: Mar. 19, 2024

(54) ADJUSTABLE BRACKET FOR DISPLAY DEVICE

(71) Applicant: KUNSHAN TAIRU ELECTRONICS CO., LTD., Jiangsu (CN)

(72) Inventor: Zhihua Rui, Kunshan (CN)

(73) Assignee: KUNSHAN TAIRU ELECTRONICS CO., LTD., Kunshan (CN)

( * ) Notice: Subject to any disclaimer, the term of this patent is extended or adjusted under 35 U.S.C. 154(b) by 0 days.

(21) Appl. No.: 17/822,801

(22) Filed: Aug. 29, 2022

(65) Prior Publication Data

US 2023/0175635 A1 Jun. 8, 2023

(30) Foreign Application Priority Data

Dec. 8, 2021 (CN) .......................... 202111492245.7

(51) Int. Cl.
*F16M 11/04* (2006.01)
*F16M 11/18* (2006.01)

(52) U.S. Cl.
CPC ........... *F16M 11/046* (2013.01); *F16M 11/18* (2013.01); *F16M 2200/028* (2013.01); *F16M 2200/047* (2013.01); *F16M 2200/065* (2013.01)

(58) Field of Classification Search
CPC ......... F16M 11/046; F16M 2200/0065; F16M 2200/063; F16M 11/18; F16M 2200/028;
(Continued)

(56) References Cited

U.S. PATENT DOCUMENTS 6,286,794 B1 * 9/2001 Harbin ............... F16M 11/2064
248/281.11
6,484,993 B2 * 11/2002 Huffman .............. F16M 11/046
248/323
(Continued)

FOREIGN PATENT DOCUMENTS

CN 206112451 U 4/2017
CN 106989260 B 10/2018
(Continued)

*Primary Examiner* — Christopher Garft
(74) *Attorney, Agent, or Firm* — METIS IP LLC

(57) ABSTRACT

The invention relates to an adjustable bracket for a display device. The adjustable bracket includes a mounting seat for being fixed to an object surface, a pylon for mounting the display device, and a connecting arm with two ends being rotatably connected to the mounting seat and the pylon, respectively. The mounting seat is provided with a lifting means and an adjusting mechanism for adjusting a retraction state of the pylon therein. The bracket is suitable for a variety of display devices of various specifications, and the pylon is adjustable in three dimensions relative to the mounting seat, thereby meeting the use requirements. The power structure is built to protect itself and to avoid safety hazards. A user can adjust the position of the pylon relative to the mounting seat by pulling and pushing, and the installation and debugging operation is simple, and an overall thickness of the bracket is small when the pylon and the mounting seat are closed up, and the storage space occupied by the bracket is small. The setting of the adjusting mechanism solves the problem of premature failure of a boosting unit caused by over-reliance on its own strength.

10 Claims, 10 Drawing Sheets

(58) Field of Classification Search
CPC . F16M 2200/047; F16M 11/38; F16M 11/048
USPC .......................................... 248/125.2, 91–923
See application file for complete search history.

(56) References Cited

U.S. PATENT DOCUMENTS

| | | | |
|---|---|---|---|
| 8,724,037 | B1 | 5/2014 | Massey |
| 8,864,092 | B2 | 10/2014 | Newville |
| 10,139,045 | B1* | 11/2018 | Keuter .................... F16M 11/38 |
| 11,033,107 | B2 | 6/2021 | Warren |
| 11,346,496 | B2* | 5/2022 | Newville ............... F16M 13/02 |
| 2012/0032062 | A1* | 2/2012 | Newville ............... F16M 13/02 |
| | | | 248/575 |
| 2012/0167486 | A1* | 7/2012 | Lee ....................... A47B 81/062 |
| | | | 52/125.2 |
| 2017/0105529 | A1* | 4/2017 | Kozlowski, Jr. ........ F16M 13/02 |
| 2019/0072231 | A1* | 3/2019 | Newville ............. F16M 13/022 |
| 2023/0016050 | A1* | 1/2023 | Newville ............. F16M 11/046 |
| 2023/0016449 | A1* | 1/2023 | Newville .................. A47F 5/08 |

FOREIGN PATENT DOCUMENTS

| | | |
|---|---|---|
| CN | 207962046 U | 10/2018 |
| CN | 208381691 U | 1/2019 |

\* cited by examiner

ADJUSTABLE BRACKET FOR DISPLAY DEVICE

CROSS-REFERENCE TO RELATED APPLICATIONS

This application claims priority to Chinese Patent Application No. 202111492245.7, filed on Dec. 8, 2021, the contents of which are hereby incorporated by reference to its entirety.

TECHNICAL FIELD OF THE INVENTION

The present invention relates to a bracket, in particular to an adjustable bracket for a display device.

BACKGROUND OF THE INVENTION

With the progress of the times, a display not only entered thousands of households, but was also used in many public places. At the same time, due to the increase in modern cultural activities, there are more and more kinds of displays used, such as traditional display equipment, electronic interactive equipment, electronic education whiteboard, etc., and the size of the display is increasing, which makes the installation difficulty, adjustable range, adjustment method and equipment use the safety of the display bracket become the problems that need to be considered emphatically when choosing the display bracket. Such as the structure of the bracket disclosed in patents with application numbers of 201710227401.4, 201820276409. X, 201820865573.4 and 201620738920.8, all of them consider and involve the above problems to a certain extent. At the same time, in order to make the bracket adjustable, a boosting unit (i.e., the spring/gas spring structure mentioned in the literature) is disposed in the bracket structure, the weight of the display device connected to the bracket is completely carried by the boosting unit, excessive dependence on the power of the boosting unit can easily lead to premature air leakage failure, fatigue wear deformation fracture and other problems of the boosting unit. Therefore, it is necessary to solve the traditional problems and overcome the failure of the boosting unit, so as to prolong the service life of the equipment and avoid the potential safety hazard caused by excessive exposure of the internal mechanical mechanism.

SUMMARY OF THE INVENTION

An object of the present invention is to provide an adjustable bracket for a display device.

In order to achieve the above purpose, the technical solution adopted by the present invention is as follows:

The present invention provides an adjustable bracket for a display device, the display device can be a general display or a tablet interactive device. The adjustable bracket includes a mounting seat for being fixed to an object surface, a pylon for mounting the display device, and a connecting arm with two ends are rotatably connected to the mounting seat and the pylon, respectively. The object surface is preferably a planar surface, such as a wall surface or a cabinet surface.

The mounting seat includes a housing, a lifting means located inside the housing, and a cable connected between the lifting means and the pylon. The lifting means includes a lifting frame that can move up and down relative to the housing, at least one elastic member with one end being fixedly connected to the lifting frame and the other end being connected to the housing, an adjusting mechanism for adjusting resistance to movement of the lifting frame relative to the housing by pressing and releasing the lifting frame, a fixed pulley block including at least one fixed pulley connected to the housing, and a movable pulley block including at least one movable pulley connected to the lifting frame.

The cable is alternately bypassing the fixed pulley and the movable pulley, one end of the cable is connected to the pylon/connecting arm, the other end of the cable is connected to the housing or the pylon/connecting arm, that is, there are two cases, in a first case, one end of the cable is connected to the pylon or the connecting arm, and the other end is connected with the housing after bypassing the fixed pulley and the movable pulley. In this case, preferably, two sets of the cable, the fixed pulley block and the movable pulley block are provided, and the two sets are symmetrically disposed on the left and right sides of the lifting means to keep the stress balance. In the other case, only one cable is used. One end of the cable is connected to the pylon/connecting arm on one side of the bracket, and the other end is connected to the pylon/connecting arm on the other side opposite to one side of the bracket after bypassing the fixed pulley and the movable pulley.

The elastic member has a first state and a second state, the lifting frame has at least a first position and a second position, and the bracket has at least two working states. When the bracket is in a first working state, the elastic member is in a first state, the lifting frame is in a first position, the movable pulley is relatively far away from the fixed pulley, and the connecting arm and the pylon are pulled and drawn to a front side of the housing by the cable; and when the bracket is in a second working state, the elastic member is transformed into a second state, the lifting frame is transferred to a second position, the movable pulley and the fixed pulley are relatively close, the connecting arm is relatively open to the housing, and the pylon is farther away from the housing than in the bracket's first working state.

By controlling the cable retraction and the change of a relative distance between the fixed pulley and the movable pulley, the connecting arm is folded or unfolded relative to the mounting seat, to control a distance between the pylon and the mounting seat. When the connecting arm is unfolded to any angle within an adjustment range relative to the mounting seat, a state of force balance is achieved between the lifting means, the pylon and the display device installed on the pylon under an action of the adjusting mechanism, so that the pylon hovers at a required height and position, it is only necessary to apply external force to the pylon to destroy the state of force balance if it is desired to adjust the pylon position. The adjusting mechanism provides resistance to the lifting of the lifting frame, which reduces the dependence of the lifting frame on the force provided by the elastic member to a certain extent, is beneficial to prolonging the service life of the elastic member, avoids the problem of premature failure of the boosting unit, and the resistance provided by the adjusting mechanism is adjustable, which can adapt to the display equipment with different weights. Further, the resistance provided by the adjusting mechanism to the lifting frame is friction, compared with traditional counterweights that only provide downward gravity, the direction of resistance provided by the adjusting mechanism is different with the moving direction of the lifting frame, during the transition between different working states of the bracket, adjusting mechanism will provide different direction of resistance, so as to make the transition more gentle and smooth.

The bracket encloses the mechanisms/devices related to power in the housing, avoids contact with personnel and avoids structural exposure, which is beneficial to protecting itself while ensuring the safety of personnel operation. Personnel adjust the position of the pylon relative to the mounting seat by pulling and pushing, and the installation and debugging operation is simple. The bracket is adjustable, and when the bracket is in the first working state, the pylon is close to the mounting seat, so that an overall thickness of the bracket is small and the occupied storage space is small.

It should be noted that the terms of direction "up", "down", "left" and "right" mentioned above or below refer to the vertical direction recognized by the public, and "back"/"rear" is defined as the side to which the mount is oriented in the bracket, whereas "front" is defined as the side to which the pylon is oriented in the bracket.

Further, the fixed pulley block includes at least one first fixed pulley disposed on a side wall of the housing and at least one second fixed pulley disposed on a rear wall or front wall of the housing, and the cable bypasses the first fixed pulley, the movable pulley and the second fixed pulley. The first fixed pulley plays a guiding role, and the second fixed pulley functions as an equal arm lever.

Further, the adjusting mechanism includes a first splint disposed on a front side of the lifting frame, a second splint disposed on a back side of the lifting frame, and a fastening means for making the first splint and the second splint relatively press or release the lifting frame. A friction force between the first splint and the second splint and the lifting frame is adjusted by pressing/releasing the lifting frame by the first splint and the second splint, thereby adjusting the resistance to the movement of the lifting frame relative to the housing.

Further, the fastening means includes an adjusting rod fixed on the rear wall of the housing and passed through the second splint, the lifting frame and the first splint from back to front, a first connector disposed in front of the first splint and passed through by the adjusting rod, an operating member disposed in front of the first connector and threaded with the front end of the adjusting rod. When the operating member is locked relative to the adjusting rod, the lifting frame is pressed tightly by the first splint and the second splint, whereas the lifting frame is released.

Further, the lifting means further includes an adjuster for adjusting a length of the elastic member when the bracket is in the first working state, a connecting rod fixedly connected to the other end of the elastic member, the left and right sides of the housing are provided with first chutes which are correspondingly disposed in a vertical direction, a middle part of the connecting rod is fixedly connected to the other end of the elastic member, and the two end portions of the connecting rod are slidingly connected to the first chutes, and the adjuster passes through the housing and abuts the connecting rod. The other end of the elastic member refers to one end of the elastic member connected to the housing. In particular, the connecting rod is also used to stabilize the elastic member and avoid shaking of elastic member, the connecting rod moves up and down in the first chute under the action of the adjuster, thereby adjusting an installation length of the elastic member, i.e., the length of the elastic member in the first working state, thereby ensuring that the connecting arm can be completely folded and fitted to the front side of the housing when the bracket is in the first working state.

Further, the pylon includes a support structure for supporting the display device and an adjusting structure disposed on a back side of the support structure for enabling the support structure to rotate about a first axis of rotation disposed in a left-right direction, a second axis of rotation disposed in an up-down direction, and a third axis of rotation disposed in a front-rear direction, respectively. From the adjustment effect of the bracket, the best viewing angle can be adjusted between upward view and downward view. The pylon can rotate towards the left rear/right rear relative to the mounting seat, and the pylon can also rotate clockwise or counterclockwise relative to the mounting seat. The pylon can be adjusted in three dimensions relative to the mounting seat. The cable is connected to the adjusting structure.

Further, the support structure includes a back plate, both sides of the back plate are respectively provided with hitching grooves disposed obliquely from front to back and from top to bottom and limiting grooves disposed along the front-rear direction, the adjusting structure includes a first adjuster, a second adjuster and a third adjuster, the first adjuster is provided with a first rotation shaft, the back plate is rotatably hitched on the first rotation shaft through the hitching grooves, and a locking member is disposed between the first adjuster and the back plate, the locking member is fitted in the limiting groove, the locking member and the limiting groove are used for determining an adjustable range of the angle of the pylon relative to the mounting seat in the upward view and the downward view, and a central axis of the first rotation shaft is the first axis of rotation.

The second adjuster is disposed on a back side of the first adjuster and is rotatably connected with the first adjuster through a vertically disposed second rotation shaft, so as to realize left/right rotation of the pylon relative to the mounting seat, and a central axis of the second rotation shaft is the second axis of rotation.

The third adjuster is located on the back side of the second adjuster, the third adjuster is provided with at least two second chutes distributed about the third axis of rotation, the second adjuster is provided with a plurality of second connectors which are fitted in the second chute in one-to-one correspondence, the third adjuster and the second adjuster relatively rotate about the third axis of rotation through a one-to-one sliding connection between the second connectors and the second chutes, that realize clockwise/counterclockwise rotation of the pylon relative to the mounting seat.

Further, the connecting arm includes a first connecting arm and a second connecting arm located below the first connecting arm, the third adjuster also has a third rotation shaft and a fourth rotation shaft disposed in the left-right direction, and the fourth rotation shaft is located below the third rotation shaft, end portions, corresponding to each other, of the first connecting arm and the second connecting arm are rotatably connected with the third adjuster through the third rotation shaft and the fourth rotation shaft, respectively, and the other end portions, corresponding to each other, of the first connecting arm and the second connecting arm are rotatably connected to the housing, and the first connecting arm, the third adjuster, the second connecting arm and the housing together form a parallelogram. The cable is connected to the third rotation shaft, and the opening and closing deformation of the quadrilateral is realized by traction of the cable, thus achieving opening and folding of the bracket.

Furthermore, a rotating wheel is sleeved on the third rotation shaft, and the cable is connected to the rotating wheel, so as to prevent wear of the cable caused by retraction of the pylon relative to the mounting seat.

Further, the support structure includes at least two cross bars respectively disposed through an upper portion and a lower portion of the back plate, first longitudinal bars capable of being slidingly connected to same end portions of the at least two cross bars in a horizontal direction, and a second longitudinal bar connected to the cross bar at the bottom and disposed in a vertical direction, that make the support structure adaptable to display devices of different sizes. In practical application, the back of the display device is connected to the back plate, the first longitudinal bar, the second longitudinal bar and the cross bars.

Further, the support structure further includes the push-pull member for facilitating operation by an operator when adjusting a state of the bracket, a retracting state of the bracket is changed by force applied to a push-pull member. Preferably, the push-pull member is slidingly connected to the second longitudinal bar in the vertical direction to accommodate the mounted display devices of different sizes without interference to the display device when the display device is mounted on the support structure.

Due to the application of the technical solution, the present invention has the following advantages compared with the prior art:

The pylon can adapt to display devices of various specifications, and the pylon is adjustable in three dimensions relative to the mounting seat, thereby meeting the use requirements of users for angle switching; power-related mechanisms/devices are enclosed in the housing to avoid contact with personnel and to avoid structural exposure, contributing to their own protection while ensuring the safety of personnel operation; personnel adjust the position of the pylon relative to the mounting seat by pulling and pushing, and the installation and debugging operation is simple, and the combination of fixed pulley and movable pulley makes the debugging of the pylon more labor-saving; the bracket is adjustable, and when the bracket is in the first working state, the pylon is close to the mounting seat, so that an overall thickness of the bracket is small and the occupied storage space is small; and the setting of the adjusting mechanism solves the problem of premature failure of the boosting unit caused by over-reliance on its own strength.

BRIEF DESCRIPTION OF THE DRAWINGS

Some specific embodiments of the present invention will be described in detail below by way of illustration and not limitation with reference to the accompanying drawings. Identical reference numerals in the drawings indicate identical or similar components or parts. It should be understood by those skilled in the art that these drawings are not necessarily drawn to scale. In the drawings.

Figure 1:
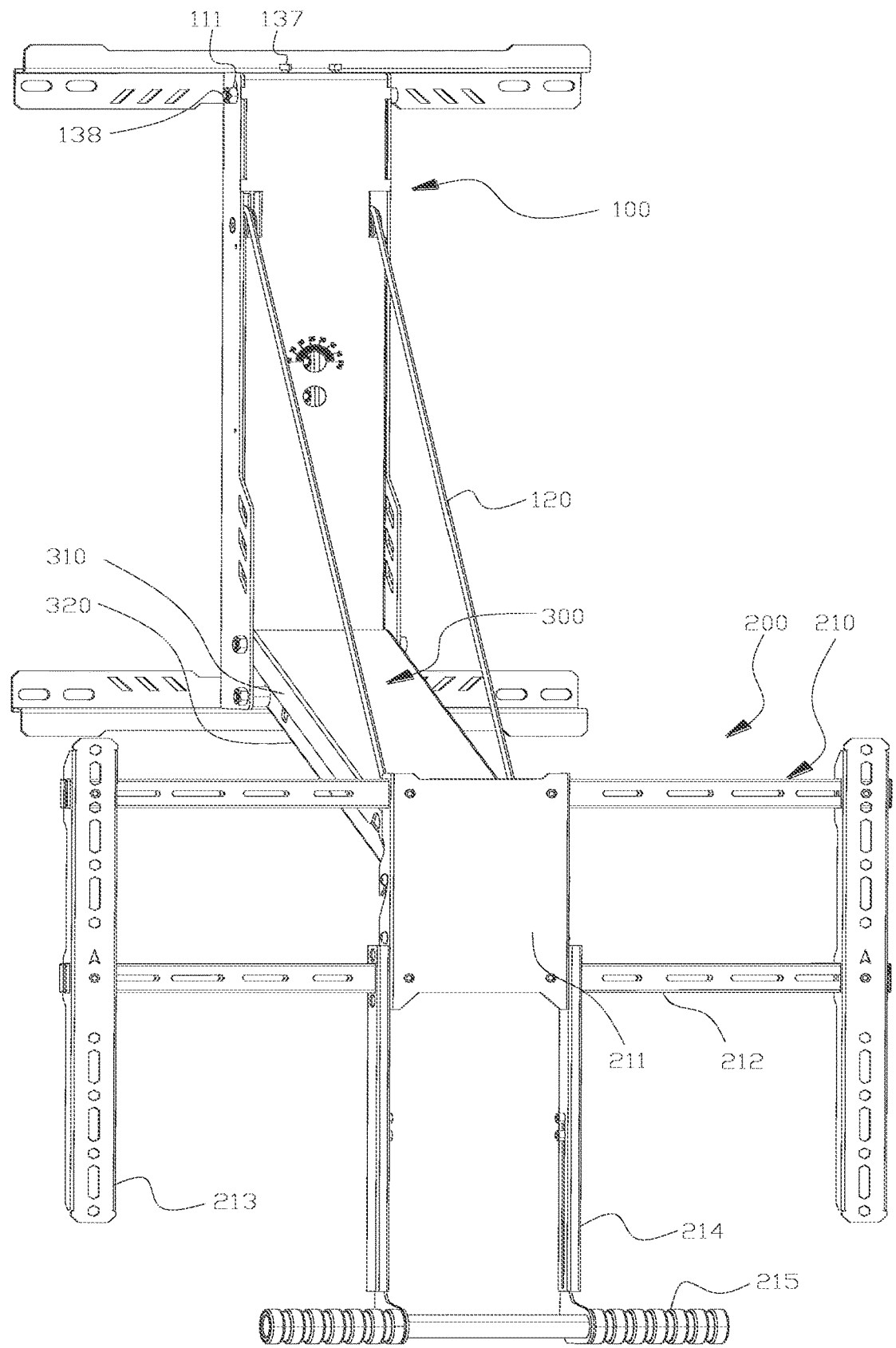
FIG. 1 is a structural schematic diagram of an adjustable bracket for a display device in a second working state according to an embodiment of the present invention.

The reference numerals in drawings may refer to the following structures:

100—mounting seat; 110—housing; 111—first chute; 120—cable; 130—lifting means; 131—lifting frame; 132—elastic member; 133—adjusting mechanism; 133A—second splint; 133C—fastening means; 133C-1—adjusting rod; 133C-2—first connector; 133C-3—operating member; 134—fixed pulley block; 134A—first fixed pulley; 134B—second fixed pulley; 135—movable pulley block; 135A—movable pulley; 136—mounting plate; 137—adjuster; 138—connecting rod; 200—pylon; 210—support structure; 211—back plate; 211A—hitching groove; 211B—limiting groove; 2110—locking member; 212—cross bar; 213—first longitudinal rod; 214—second longitudinal rod; 215—push-pull member; 220—adjusting structure; 221—first adjuster; 222—first rotation shaft; 223—second adjuster; 224—second rotation shaft; 225—third adjuster; 226—third rotation shaft; 227—third chute; 228—second connector; 229—fourth rotation shaft; 300—connecting arm; 310—first connecting arm; 320—second connecting arm; 400—rotating wheel.

DETAILED DESCRIPTION OF THE INVENTION

A clear and complete description of the technical solution of the present invention will be made below in conjunction with the drawings. Obviously, the described embodiments are part of the embodiments of the present invention, but not all of them. Based on the embodiments of the present invention, all other embodiments obtained by those ordinarily skilled in the art without exerting creative effort fall within the scope of protection of the present invention.

In the description of the present invention, it should be noted that the terms "up", "down", "left" and "right" for direction description are defined according to the direction in which the user faces the bracket under normal use conditions, and "back"/"rear" is defined as the side to which the mount is oriented in the bracket, whereas "front" is defined as the side to which the pylon is oriented in the bracket. Further the technical features involved in the different embodiments of the present invention described below may be combined with each other as long as they do not conflict with each other.

Embodiment 1

Figure 2:
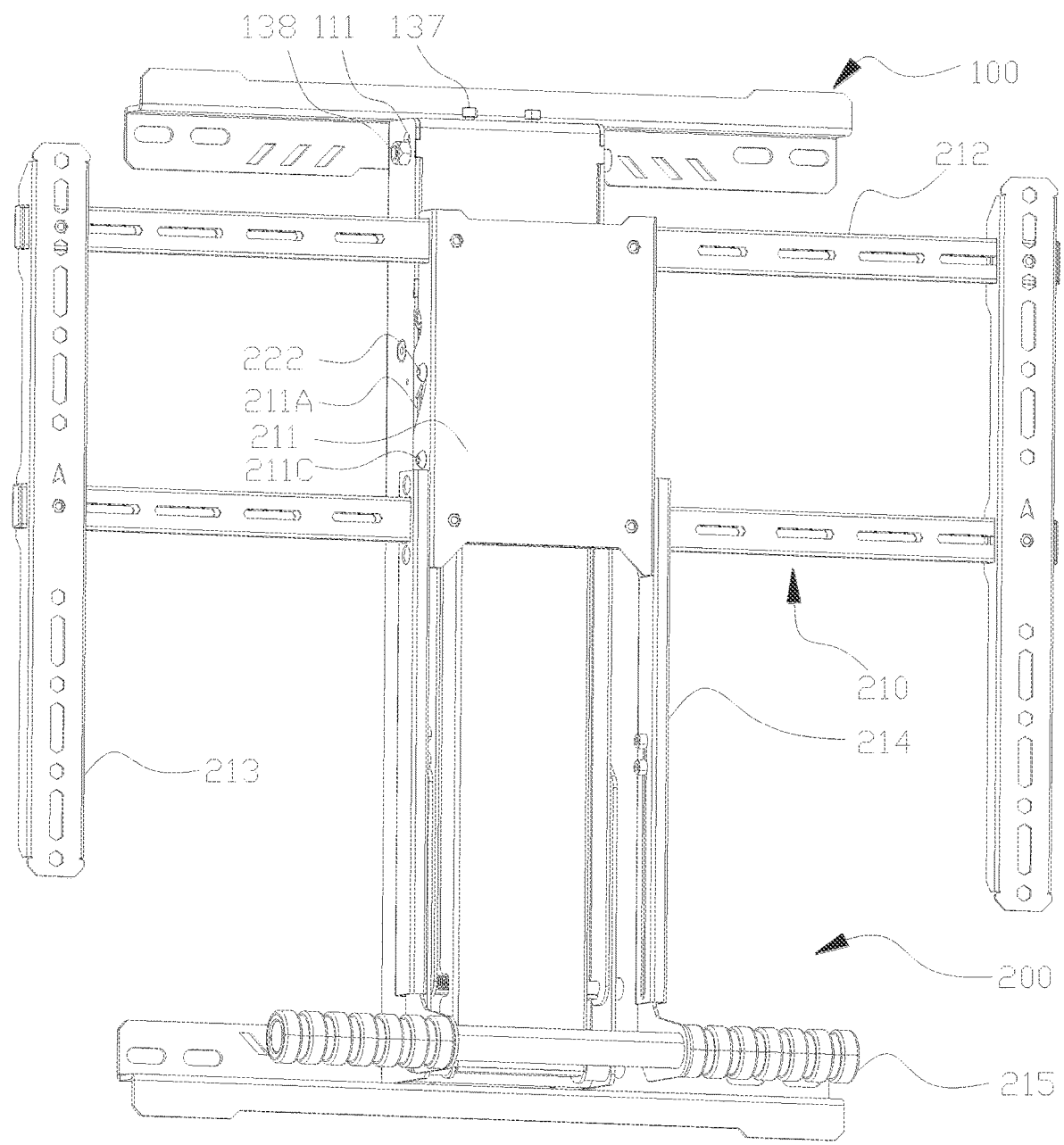
FIG. 2 is a structural schematic diagram of the adjustable bracket for the display device in a first working state according to an embodiment of the present invention.
Figure 3:
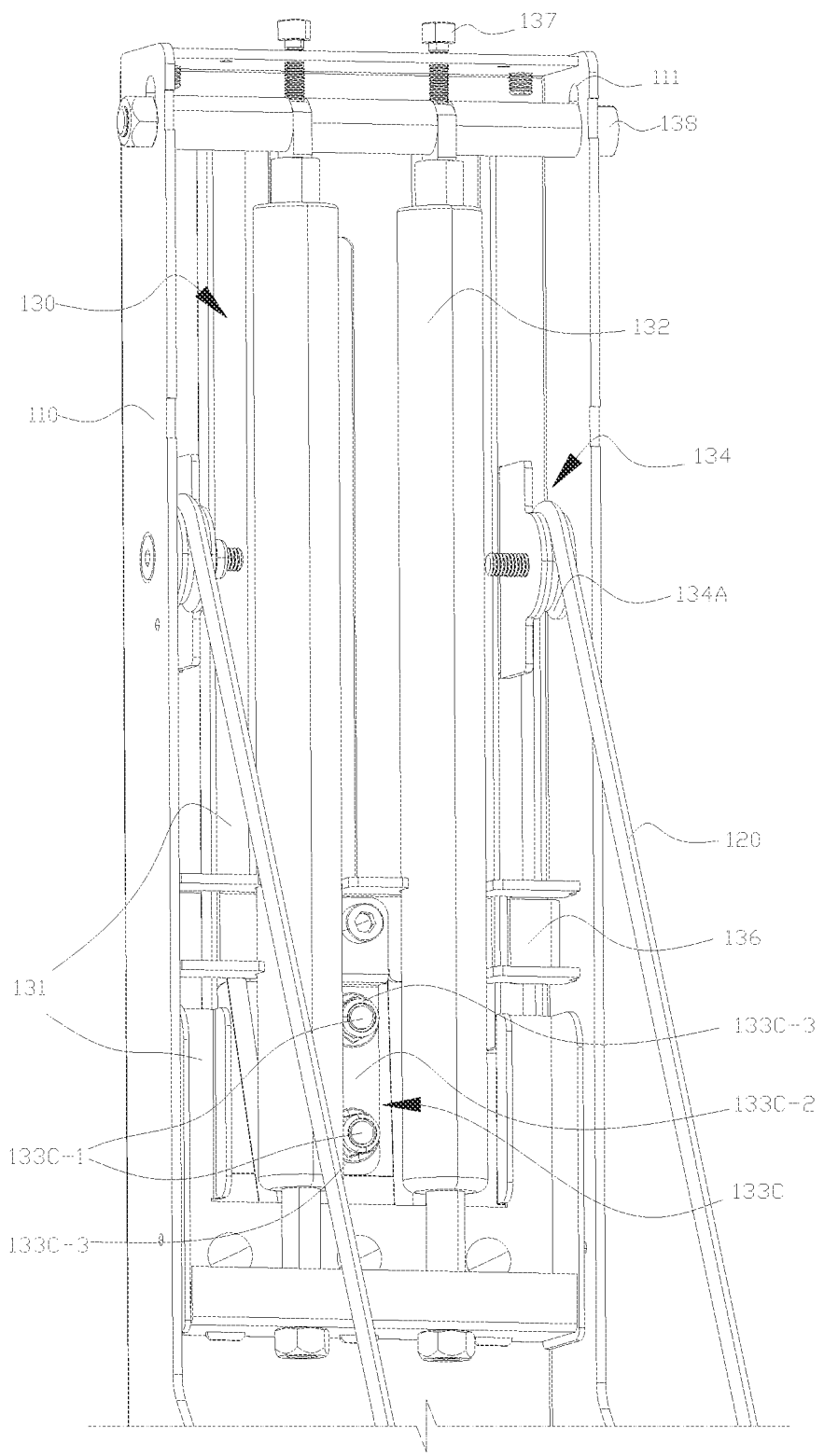
FIG. 3 is a schematic diagram of an internal structure of a mounting seat in the adjustable bracket for the display device according to an embodiment of the present invention.
Figure 4:
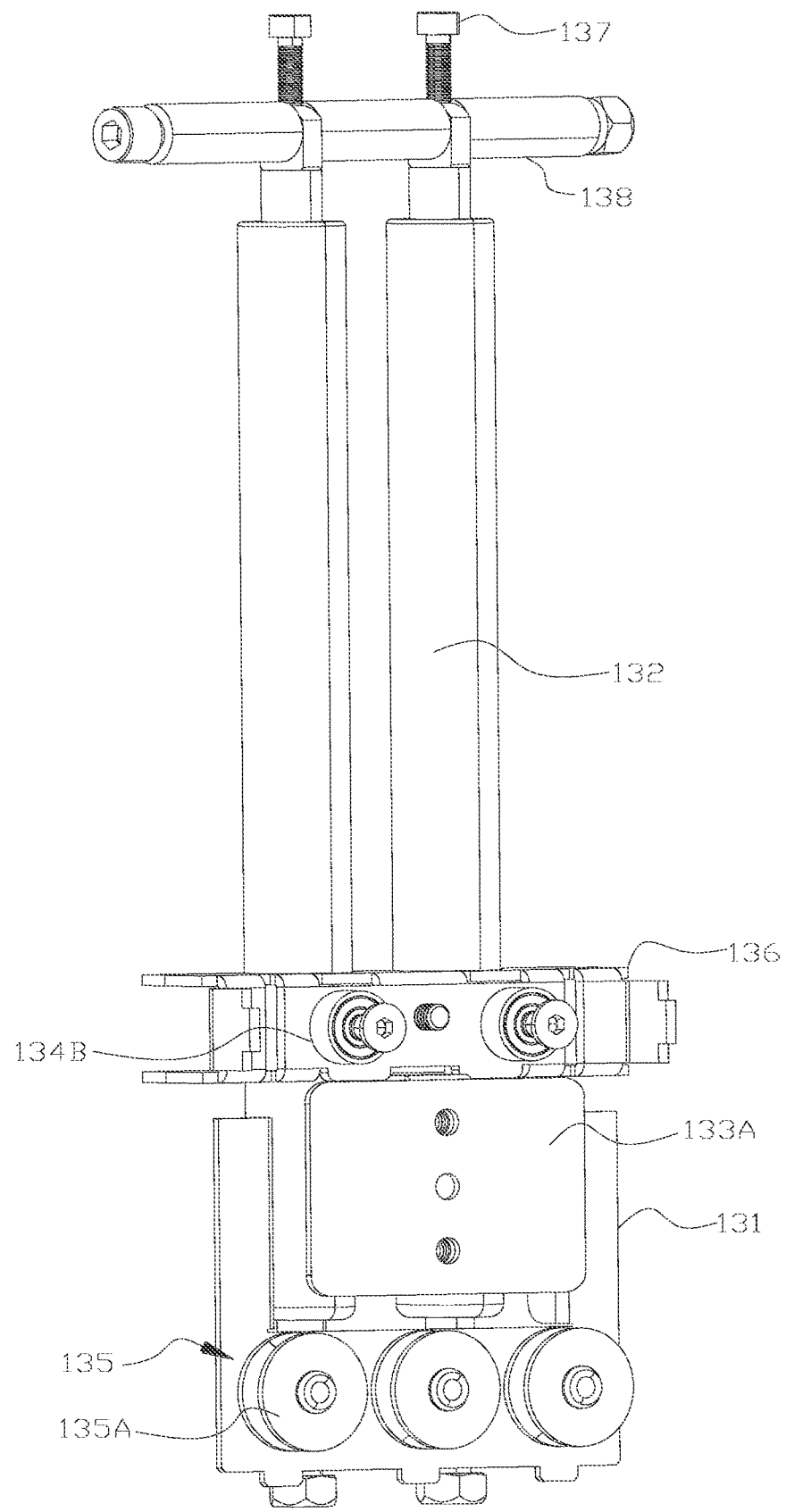
FIG. 4 is a schematic diagram of an internal structure of a lifting means in the adjustable bracket for the display device according to an embodiment of the present invention.
Figure 5:
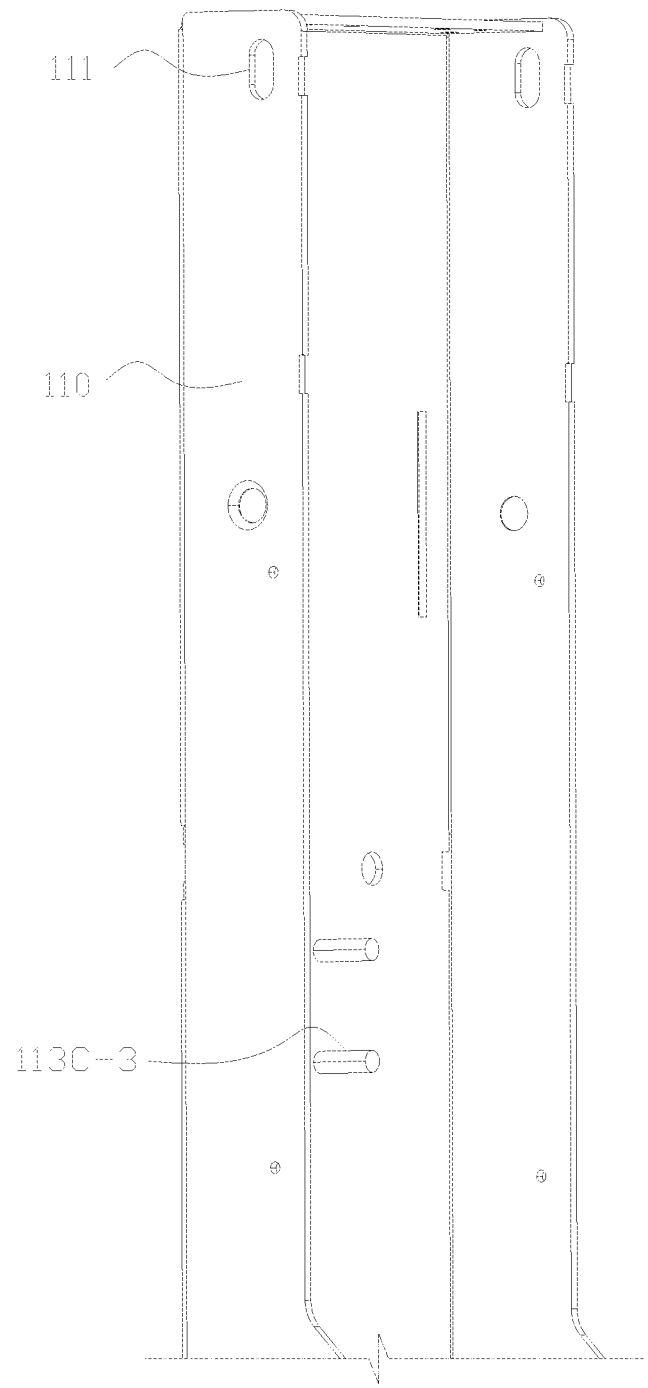
FIG. 5 is a structural schematic diagram of a rear portion of a housing in the adjustable bracket for the display device according to an embodiment of the present invention.
Figure 6:
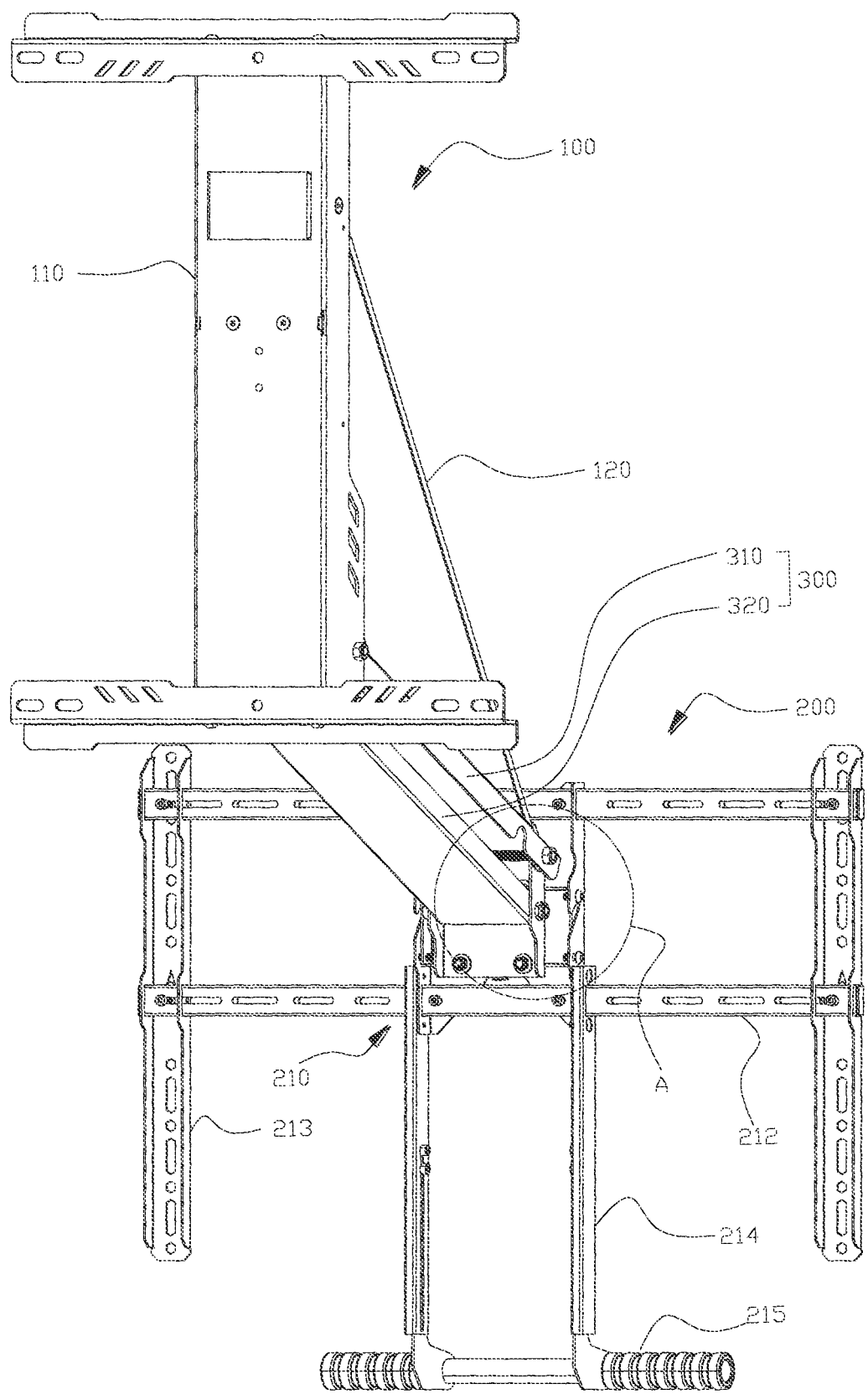
FIG. 6 is a structural schematic diagram from another view of FIG. 1 of the present invention.
Figure 7:
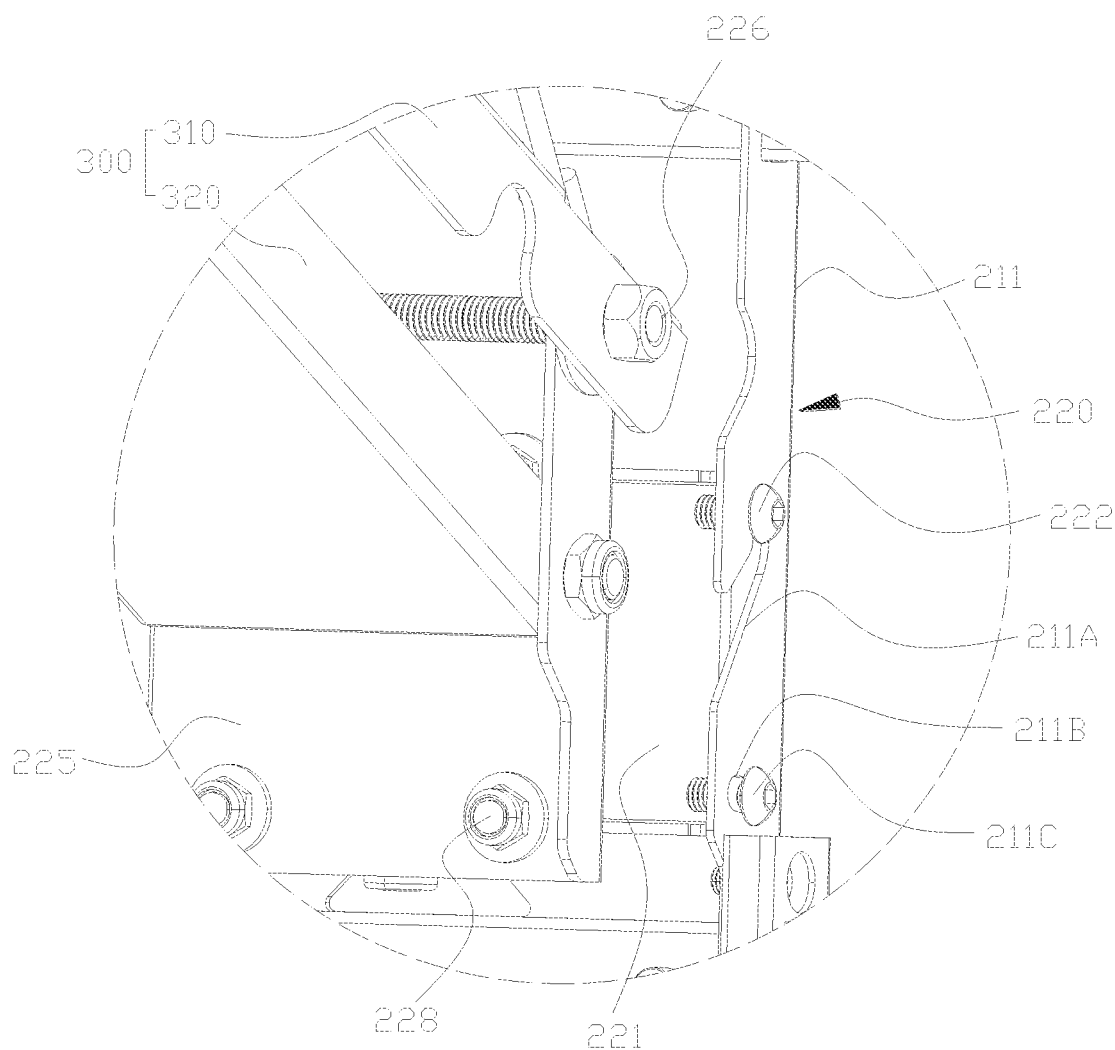
FIG. 7 is an enlarged partial view of region A in FIG. 6.
Figure 8:
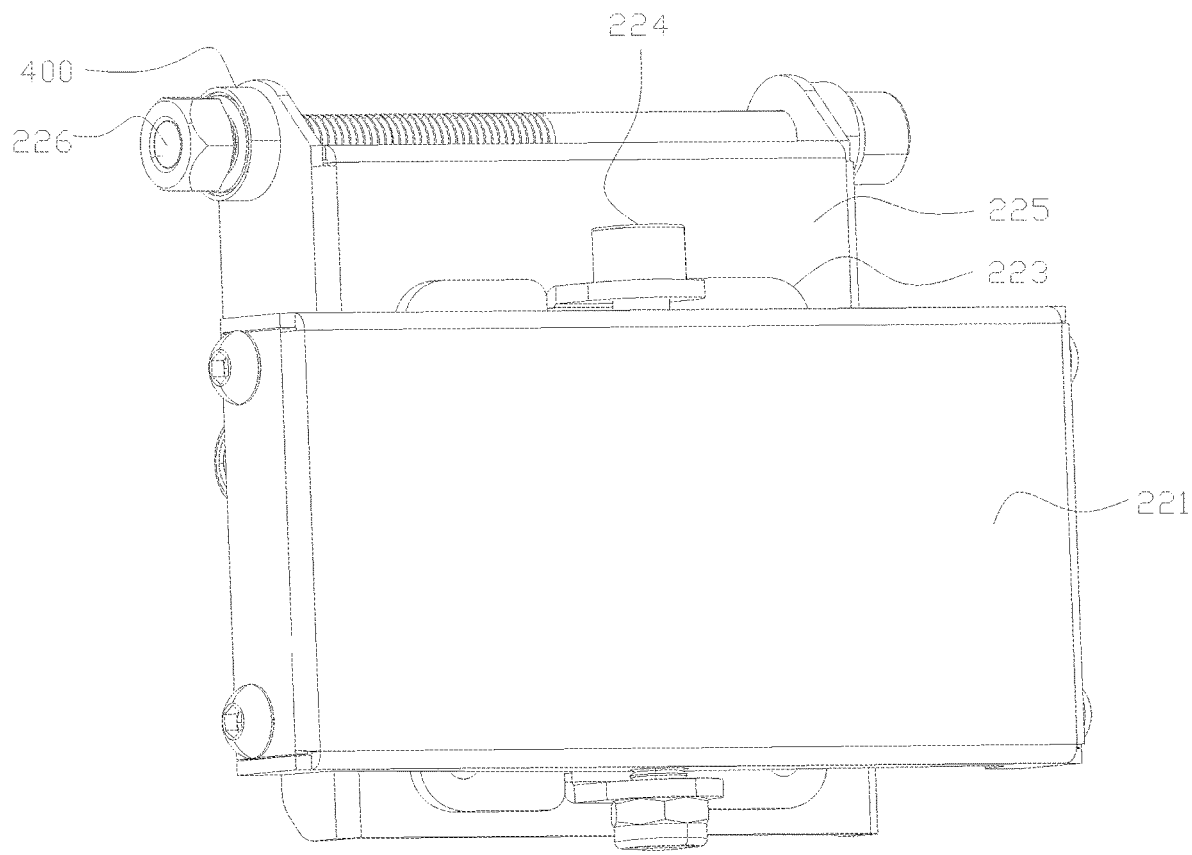
FIG. 8 is a structural schematic diagram of an adjusting structure in the adjustable bracket for the display device according to an embodiment of the present invention.
Figure 9:
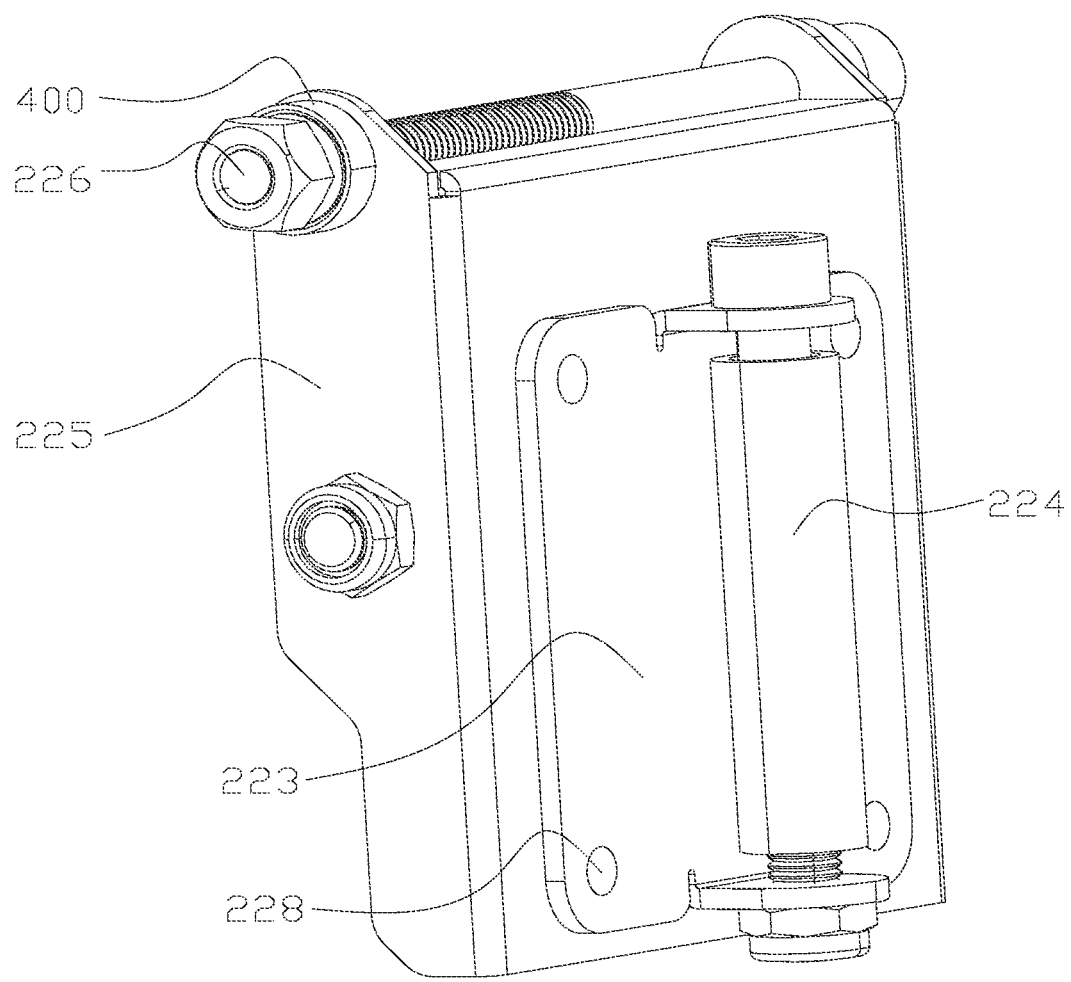
FIG. 9 is a schematic diagram of a structure of a second adjuster and a third adjuster interconnected of the adjustable bracket for the display device according to an embodiment of the present invention.
Figure 10:
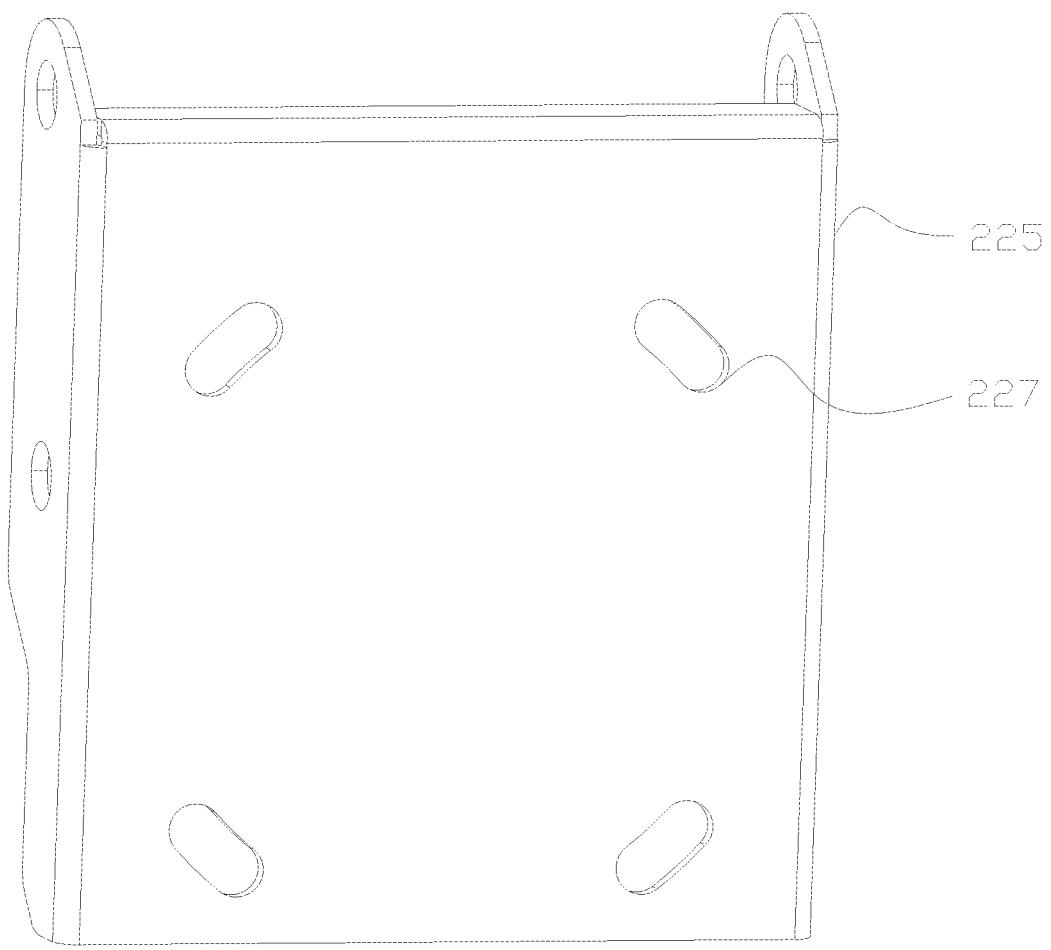
FIG. 10 is a structural schematic diagram of the third adjuster of the adjustable bracket for the display device according to an embodiment of the present invention.

Referring to FIG. 1 to FIG. 10, the adjustable bracket for the display device in this embodiment includes three major parts: a mounting seat 100, a connecting arm 300, and a pylon 200. The mounting seat 100 is fixedly connected to an object surface, preferably a planar surface, such as a wall surface or a cabinet surface. The pylon 200 is used for mounting a display device such as a general display and a tablet interactive device. Both ends of the connecting arm 300 are rotatably connected with the mounting seat 100 and the pylon 200, respectively.

The mounting seat 100 includes a housing 110, a lifting means 130 and a cable 120. The housing 110 is fixedly connected with the object surface, and the lifting means 130 is located inside the housing 110 to avoid contact with and exposure of the device, which is beneficial to protecting the device and ensuring the safety of the user. The cable 120 is used for hoisting the pylon 200 and is connected between the lifting means 130 and the pylon 200.

The lifting means 130 includes a lifting frame 131, two elastic members 132, an adjusting mechanism 133, a fixed pulley block 134, a movable pulley block 135, a mounting plate 136, two adjusters 137, and a connecting rod 138. The lifting frame 131 can move up and down relative to the housing 110, and the mounting plate 136 is fixedly connected to the housing 110.

One end of the two elastic members 132 are fixedly connected with the lifting frame 131. The left and right sides of the housing 110 are provided with first chutes 111 which are correspondingly disposed in a vertical direction. A middle part of the connecting rod 138 is fixedly connected to the other end of the elastic members 132, and the two end portions of the connecting rod 138 are slidingly connected to the first chutes 111. Two adjusters 137 pass through the housing 110 and abuts the connecting rod 138, the force exerted by the adjusters 137 on the connecting rod 138 is opposite to that exerted by the elastic members 132 on the connecting rod 138, and the positions of the two adjusters 137 correspond to the positions of two elastic members 132 up and down, to balance the force on the connecting rod 138 and to stabilize its position of the connecting rod 138. When the bracket is assembled and used, due to the tolerance of the parts themselves, the errors generated during assembly and installation, as a result, when the bracket is in the first working state (which will be described in detail below), the connecting arm 300 cannot be fully folded and fitted to the front side of the housing 110. Therefore, the adjuster 137, the connecting rod 138 and the first chute 111 are provided for adjusting the elastic member to a proper length during assembly and use, so that the connecting arm 300 can be fully folded and fitted to the front side of the housing 110 in the first state. On the other hand, the connecting rod 138 may also stabilize the elastic members 132 to prevent the elastic members 132 from shaking within the housing 110. In the embodiment shown in the FIG. 3, the adjuster 137 is connected with the housing 110 by thread, and the adjuster 137 is rotated to move up and down, thus adjusting the position of the connecting rod 138, and then adjusting the length of the elastic members 132.

The fixed pulley block 134 includes two first fixed pulleys 134A disposed on both side walls of the housing 110, and two second fixed pulleys 134B disposed on the mounting plate 136. The movable pulley block 135 includes three movable pulleys 135A each connected to the lifting frame 131. The number of the second fixed pulley 1346 and the movable pulley 135A can be set according to the actual situation. One end of the cable 120 is connected to one side of the pylon 200 (or the connecting arm 300), and the other end of the cable 120 bypasses the first fixed pulley 134A on one side, then alternately bypasses the movable pulley 135A and the second fixed pulley 1346 in turn, then bypasses the first fixed pulley 134A on the other side, and then is connected to the other side of the pylon 200 (or the connecting arm 300). The connection positions of both ends of the cable 120 are symmetrical to ensure force balance.

The adjusting mechanism 133 adjusts the resistance to the movement of the lifting frame 131 relative to the housing 110 by pressing and releasing the lifting frame 131. Specifically, the adjusting mechanism 133 includes a first splint (not shown in the drawings) and a second splint 133A at front and rear sides of the lifting frame 131, respectively. The adjusting mechanism 133 further includes fastening means 133C for allowing the first and second splints to press or release the lifting frame 131. The fastening means 133C includes an operating member 133C-3, a first connecting member 133C-2, and an adjusting rod 133C-1. The first connecting member 133C-2 is provided on the front side of the first splint (in FIG. 3, the first splint is not indicated because it is largely shielded by the first connecting member 133C-2 and the elastic member 132), the operating member 133C-3 is provided on the front side of the first connecting member 133C-2, a rear end of the adjusting rod 133C-1 is fixedly provided on a rear wall of the housing 110, and the adjusting rod 133C-1 passes through the second splint 133A, the lifting frame 131 (the lifting frame 131 is provided with a relief slot provided in a vertical direction to avoid the adjusting rod 133C-1 when the lifting frame 131 moves), the first splint, the first connecting member 133C-2 in order from rear to front, and then is connected to the operating member 133C-3 by thread. During adjustment, by rotating the operating member 133C-3, the operating member 133C-3 moves backward/forward relative to the adjusting rod 133C-1 under the action of a threaded structure, the first connecting member 133C-2 presses/releases the first splint, and then the first splint presses/releases the lifting frame 131, and the lifting frame 131 presses against the second splint 133A after being stressed, so that the resistance exerted by the adjusting mechanism 133 on the lifting frame 131 is correspondingly increased/decreased. Preferably, the first splint and the second splint 133A are made of flexible material such as rubber, to provide appropriate friction to the lifting frame 131 while avoiding scratching the lifting frame 131 and generating noise, and the first connector 133C-2 is made of rigid material to increase a force application area of the first splint when pressing the lifting frame 131. According to the weight of the display device to which the pylon 200 needs to be hitched, the resistance applied to the lifting frame 131 is adjusted to make the bracket more stable when it is in a second working state (which will be described in detail below), and on the other hand, it is beneficial to reduce dependence on the boosting unit, thereby avoiding the problem of premature failure of the boosting unit. Moreover, the adjustment operation is very simple. In addition, it should be noted that although the resistance exerted by the adjusting mechanism 133 on the lifting frame 131 is adjustable, it should not be too large to ensure that the elastic members 132 can make the lifting frame 131 move when the bracket transitions from the second working state to the first working state.

The working principle of the lifting means 130 is as follows, the first fixed pulley 134A in this embodiment plays a guiding role, the second fixed pulley 134B functions as an equal arm lever, and the second fixed pulley 134B is positioned above the movable pulley 135A, an upper end of the elastic member 132 is connected to a top of the housing 110 through the connecting rod 138, a lower end is connected to a bottom of the lifting frame 131, and provides downward thrust to the lifting frame 131. The elastic member 132 has a first state and a second state. A length of the elastic member 132 in the first state is longer than that in the second state. The lifting frame 131 has at least a first position and a second position. The first position is lower than the second position. The bracket has at least two working states. When the bracket is in the first working state, the elastic member 132 is in the first state, the lifting bracket 131 is in the first position, the movable pulley 135A is relatively far away from the first fixed pulley 134A and the second fixed pulley 134B, and the connecting arm 300 and the pylon 200 are pulled and drawn to the front side of the housing 110 by the cable 120. At this time, the bracket as a whole is thin and occupies a small space. When the bracket is in the second working state, the elastic member 132 is transformed into the second state, the movable pulley 135A is relatively close to the second fixed pulley 134B, the lifting frame 131 is moved up to the second position, the connecting arm 300 is unfolded relative to the housing 110, and the pylon 200 is farther away from the housing 110 than in the bracket's first working state. By controlling the cable 120 retraction and the change of a relative distance between the fixed pulley and the movable pulley 135A, the connecting arm 300 is folded or unfolded relative to the mounting seat 100, to control a distance between the pylon 200 and the mounting seat 100.

Here, the first working state and the second working state are defined as two limit states within the adjustment range of the bracket, that is, the connecting arm 300 is at limit positions within the adjustment range in the first working state and the second working state, respectively. Under the action of the adjusting mechanism 133, a state of force balance is achieved between the lifting means 130 and the pylon 200 and the display device mounted on the pylon 200. Under the condition that no external force is artificially applied, the bracket can be kept in any state between the first working state and the second working state, thereby hovering the pylon 200 at a required height and position. If the position of the pylon 200 is to be adjusted, only the artificially applied external force is needed to destroy the state of force balance. The resistance provided by the adjusting mechanism 133 to the lifting frame 131 is friction, therefore the direction of resistance is different with the moving direction of the lifting frame 131. During the transition from the first working state to the second working state of the bracket, the direction of resistance provided by the adjusting mechanism 133 to the lifting frame 131 is the same as the direction of force provided by the elastic members 132 to the lifting frame 131, on the contrary, during the transition from the second working state to the first working state of the bracket, the direction of resistance provided by the adjusting mechanism 133 to the lifting frame 131 is opposite to the direction of force provided by the elastic members 132 to the lifting frame 131, so as to make the transition more gentle and smooth.

In this embodiment, an opening and closing angle of the connecting arm 300 relative to the housing 110 is adjusted from 0° to 115°. In practice, the range of the opening and closing angle of the connecting arm 300 relative to the housing 110 can be adjusted according to actual needs and is not limited herein. The elastic member 132 in this embodiment adopts the gas spring in the prior art, and in practical application, an elastic component with the same function in the prior art can also be selected.

The pylon 200 includes a support mechanism 210 and an adjusting structure 220. The support structure 210 includes a back plate 211, two cross bars 212, two first longitudinal bars 213, two second longitudinal bars 214, a push-pull member 215. The two cross bars 212 are respectively disposed through upper and lower portions of the back plate 211. The two first longitudinal bars 213 are respectively positioned at both ends of the cross bars 212. An upper portion and a lower portion of each of the first longitudinal bars 213 are slidingly connected with the two cross bars 212 in a horizontal direction, the second longitudinal bar 214 is connected with the cross bar 212 located at the lower portion, and the push-pull member 215 is slidingly connected with the second longitudinal bar 214 in a vertical direction. The pylon 200 is suitable for display devices of different sizes. In practical application, the back of the display device is connected with the back plate 211, the first longitudinal bar 213, the second longitudinal bar 214, and the cross bar 212. A user pulls and pushes the push-pull member 215 to adjust the position of the pylon 200 relative to the mounting seat 100, thereby changing the retraction state of the bracket, and the installation and debugging operation is simple.

The adjusting structure 220 includes a first adjuster 221, a second adjuster 223, and a third adjuster 225. The first adjuster 221 is provided with a first rotation shaft 222 disposed in the horizontal direction. Both sides of the back plate 211 are respectively provided with hitching grooves 211A disposed obliquely from front to back and from top to bottom. The back plate 211 is rotatably hitched on the first rotation shaft 222 through the hitching grooves 211A. A central axis of the first rotation shaft 222 is an axis of rotation of the back plate 211 relative to the first adjuster 221. The best viewing angle can be adjusted between upward view and downward view. In addition, both sides of the back plate 211 are respectively provided with limiting grooves 211B disposed along the front-rear direction, strictly, the limiting grooves 211B is an arc centered at a point on the central axis of the first rotating axis 222. A locking member 211C is disposed between the first adjuster 221 and the back plate 211, the locking member 211C is fitted in the limiting groove 211B, the locking member 211C and the limiting groove 211B are used for determining an adjustable range of the angle.

The second adjuster 223 is disposed on a back side of the first adjuster 221 and is rotatably connected with the first adjuster 221 through a vertically disposed second rotation shaft 224, so that the pylon 200 can rotate to the left/right relative to the mounting seat 100, and a central axis of the second rotation shaft 224 is an axis of rotation of the back plate 211 relative to the second adjuster 223.

The third adjuster 225 is located on the back side of the second adjuster 223. The third adjuster 225 is provided with at least two second chutes 227 distributed about the third axis of rotation. The second adjuster 223 is provided with a plurality of second connectors 228 and the second connectors 228 are slidingly connected in the second chutes 227 in one-to-one correspondence, so that enabled the third adjuster 225 and the second adjuster 223 to be relatively rotatably connected about the third axis of rotation, so that the pylon 200 rotates clockwise/counterclockwise with respect to the mounting seat 100.

The third adjuster 225 also has a third rotation shaft 226 and a fourth rotation shaft 229 disposed in the left-right direction, and the fourth rotation shaft 229 is located below the third rotation shaft 226. The connecting arm 300 includes a first connecting arm 310 and a second connecting arm 320 located below the first connecting arm 310. End portions, corresponding to each other, of the first connecting arm 310 and the second connecting arm 320 are rotatably connected with the third adjuster 225 through the third rotation shaft 226 and the fourth rotation shaft 229, respectively, and the other end portions, corresponding to each other, of the first connecting arm 310 and the second connecting arm 320 are rotatably connected to the housing 110, and the first connecting arm 310, the third adjuster 225, the second connecting arm 320 and the housing 110 together form a parallelogram. A rotating wheel 400 is sleeved on the third rotation shaft 226. The cable 120 is connected to the third rotation shaft 400, and the opening and closing deformation of the quadrilateral is realized by traction of the cable 120, thus achieving opening and closing of the bracket. The function of the rotating wheel 400 is to prevent the bracket from opening and closing and causing wear to the cable 120.

It should also be noted that the number of the first fixed pulley 134A, the second fixed pulley 134B, the movable pulley 135A, the elastic member 132, the adjuster 137, the first longitudinal bar 213, the second longitudinal bar 214, and the cross bar 212 can be set according to actual requirements without being limited by the present embodiment.

Embodiment 2

This embodiment differs from Embodiment 1 in that one ends of the two elastic members 132 are fixedly connected to the lower portion of the lifting frame 131, and the other ends are connected to the bottom of the housing 110. The elastic members 132 provide downward pulling force to the lifting frame 131, and a length of the elastic member 132 in the first state is shorter than that in the second state. During the transition of the bracket from the first working state to the second working state, the elastic member 132 is elongated.

Positions of the first chutes 111 are adaptively provided at left and right sides of the lower portion of the housing 110, both end portions of the connecting rod 138 are slidingly connected with the first chutes 111, and two adjusters 137 pass through the bottom of the housing 110 to connect with the connecting rod 138, as in embodiment 1, the force exerted by the adjuster 137 on the connecting rod 138 is opposite to the force exerted by the elastic member 132 on the connecting rod 138, and positions of the two adjusters 137 correspond to the positions of the two elastic members 132 vertically, the functions of the connecting rod 138, the first chutes 111 and adjusters 137 are the same as in Embodiment 1. The specific connection structure between the adjuster 137 and the housing 110 and between the adjuster 137 and the connecting rod 138 can be realized by the prior art.

Other structures of this embodiment are the same as those of Embodiment 1 and will not be described here. The number of the movable pulleys and fixed pulleys can also be adjusted according to the actual situation.

The principle of this embodiment is the same as that of Embodiment 1, and the structure of this embodiment can be thought of by those skilled in the art by combining the description of this embodiment with the drawings of Embodiment 1, so it is not shown in the drawings.

Embodiment 3

This embodiment differs from Embodiment 1 in that the movable pulley 135A is positioned above the second fixed pulley 1346, one ends of the two elastic members 132 are connected to the upper portion of the housing 110, and the other ends are fixedly connected to the lifting frame 131, and the elastic members 132 provide upward pulling force to the lifting frame 131, and a length of the elastic member 132 in the first state is shorter than that in the second state. When the bracket transitions from the first working state to the second working state, the lifting bracket 131 moves downward and the elastic member 132 is elongated.

Two adjusters 137 pass through the top of the housing 110 to connect with the connecting rod 138, as in embodiment 1, the force exerted by the adjuster 137 on the connecting rod 138 is opposite to the force exerted by the elastic member 132 on the connecting rod 138, and positions of the two adjusters 137 correspond to the positions of the two elastic members 132 vertically, the functions of the connecting rod 138, the first chutes 111 and adjusters 137 are the same as in Embodiment 1. The specific connection structure between the adjuster 137 and the housing 110 and between the adjuster 137 and the connecting rod 138 can be realized by prior art.

The principle of this embodiment is the same as that of Embodiment 1, and the structure of this embodiment can be thought of by those skilled in the art by combining the description of this embodiment with the drawings of Embodiment 1, so it is not shown in the drawings. The number of the movable pulleys and fixed pulleys can also be adjusted according to the actual situation.

Embodiment 4

This embodiment differs from Embodiment 1 in that the movable pulley 135A is positioned above the second fixed pulley 1346, one ends of the two elastic members 132 are fixedly connected to the lower portion of the lifting frame 131, and the other ends are connected to the bottom of the housing 110. In this case, the elastic members 132 provide upward thrust to the lifting frame 131, and a length of the elastic member 132 in the first state is longer than that in the second state. When the bracket transitions from the first working state to the second working state, the lifting bracket 131 moves downward, and the elastic member 132 is pressed short in the second state.

Positions of the first chutes 111 are adaptively provided at left and right sides of the lower portion of the housing 110, both end portions of the connecting rod 138 are slidingly connected with the first chutes 111, and two adjusters 137 pass through the bottom of the housing 110 to abuts the connecting rod 138, as in embodiment 1, the force exerted by the adjuster 137 on the connecting rod 138 is opposite to the force exerted by the elastic member 132 on the connecting rod 138, and positions of the two adjusters 137 correspond to the positions of the two elastic members 132 vertically, the functions of the connecting rod 138, the first chutes 111 and adjusters 137 are the same as in Embodiment 1.

Other structures of this embodiment are the same as those of Embodiment 1 and will not be described here.

The principle of this embodiment is the same as that of Embodiment 1, and the structure of this embodiment can be thought of by those skilled in the art by combining the description of this embodiment with the drawings of Embodiment 1, so it is not shown in the drawings. The number of the movable pulleys and fixed pulleys can also be adjusted according to the actual situation.

Embodiment 5

This embodiment differs from Embodiment 1 in that the bracket of this embodiment has two cables 120, two fixed pulley blocks 134, and two movable pulley blocks 135, the two fixed pulley blocks 134 are symmetrically disposed on the left and right sides of the housing, and the two movable pulley blocks 135 are symmetrically disposed on the left and right sides of the housing. One end of the cable 120 at the left side of the bracket is connected to the left side of the pylon 200 or the connecting arm 300, and the other end of the cable 120 is connected to the housing 110 after bypassing the first fixed pulley 134A, the movable pulley 135A and the second fixed pulley 1346 at the left side. One end of the cable 120 at the right side of the bracket is connected to the right side of the pylon 200 or the connecting arm 300, and the other end of the cable 120 is connected to the housing 110 after bypassing the first fixed pulley 134A, the movable pulley 135A and the second fixed pulley 1346 at the right side. The corresponding end portions of the two cables 120 should be connected to the two corresponding positions of the bracket to ensure force balance. The specific number of the first pulley 134A, the moving pulley 135A, the second fixed pulley 134B and the specific winding mode of the cable 120 on the pulleys can be set according to the actual situation.

Other structures of this embodiment are the same as those of Embodiment 1 and will not be described here. The principle of this embodiment is the same as that of Embodiment 1, and the structure of this embodiment can be thought of by those skilled in the art by combining the description of this embodiment with the drawings of Embodiment 1, so it is not shown in the drawings. The number of the movable pulleys and fixed pulleys can also be adjusted according to the actual situation.

The above embodiments are only for illustrating the technical concept and characteristics of the present invention, its purpose is to enable those familiar with the technique to understand the contents of the present invention and implement it accordingly, and cannot limit the scope of protection of the present invention. Any equivalent changes or modifications made according to the spirit of the present invention should be covered within the scope of protection of the present invention.

What is claimed is:

1. An adjustable bracket for a display device, comprising:
   a pylon (200) for mounting the display device; and
   a connecting arm (300) with two ends, wherein one of the two ends is rotatably connected to the pylon (200) and another one of the two ends is rotatably connected to a mounting seat (100) for being fixed to an object surface, wherein the mounting seat (100) includes:
   a housing (110);
   a lifting means (130) located inside the housing (110), the lifting means (130) comprising a lifting frame (131) capable of moving up and down relative to the housing (110), at least one elastic member (132) with one end being fixedly connected to the lifting frame (131) and the other end being connected to the housing (110), an adjusting mechanism (133) for adjusting resistance to movement of the lifting frame (131) relative to the housing (110) by pressing and releasing the lifting frame (131), a fixed pulley block (134) comprising at least one fixed pulley connected to the housing (110), and a movable pulley block (135) comprising at least one movable pulley (135A) connected to the lifting frame (131); and
   a cable (120), one end of which is connected to the pylon (200) or the connecting arm (300) and the other end of which is connected to the housing after engaging the fixed pulley and the movable pulley (135A),
   wherein when the adjustable bracket is in a first working state, the elastic member (132) is in a first state, the lifting frame (131) is in a first position, the movable pulley (135A) is relatively far away from the fixed pulley, and the connecting arm (300) and the pylon (200) are pulled and drawn to a front side of the housing (110) by the cable (120); and
   wherein when the adjustable bracket is in a second working state, the elastic member (132) is transformed into a second state, the lifting frame (131) is transferred to a second position, the movable pulley (135A) and the fixed pulley are relatively close, the connecting arm (300) is relatively open to the housing (110), and the pylon (200) is farther away from the housing (110) than in the adjustable bracket's first working state.

2. The adjustable bracket for the display device according to claim 1, wherein the fixed pulley block (134) comprises at least one first fixed pulley (134A) disposed on a side wall of the housing (110) and at least one second fixed pulley (134B) disposed on a rear wall or front wall of the housing (110), and the cable (120) engages the first fixed pulley (134A), the movable pulley (135A) and the second fixed pulley (134B).

3. The adjustable bracket for the display device according to claim 1, wherein the adjusting mechanism (133) comprises a first splint disposed on a front side of the lifting frame (131), a second splint (133A) disposed on a back side of the lifting frame (131), and a fastening means (133C) for making the first splint and the second splint (133A) relatively press or release the lifting frame (131).

4. The adjustable bracket for the display device according to claim 3, wherein the fastening means (133C) comprises an adjusting rod (133C-1) fixed on the rear wall of the housing (110) and passing through the second splint (133A), the lifting frame (131) and the first splint from back to front, a first connector (133C-2) disposed in front of the first splint and passed through by the adjusting rod (133C-1), an operating member (133C-3) threaded with the front end of the adjusting rod (133C-1).

5. The adjustable bracket for the display device according to claim 1, wherein the lifting means (130) further comprises an adjuster (137) for adjusting a length of the elastic member (132) when the adjustable bracket is in the first working state, a connecting rod (138) fixedly connected to the other end of the elastic member (132), left and right sides of the housing (110) are provided with first chutes (111) correspondingly disposed in a vertical direction, a middle part of the connecting rod (138) is fixedly connected to the other end of the elastic member (132), and two end portions of the connecting rod (138) are slidingly connected to the first chutes (111) at left and right sides, and the adjuster (137) passes through the housing (110) and abuts the connecting rod (138).

6. The adjustable bracket for the display device according to claim 1, wherein the pylon (200) comprises a support structure (210) for supporting the display device and an adjusting structure (220) disposed on a back side of the support structure (210) for enabling the support structure (210) to rotate about a first axis of rotation disposed in a left-right direction, a second axis of rotation disposed in an up-down direction, and a third axis of rotation disposed in a front-rear direction, respectively; and the cable (120) is connected to the adjusting structure (220).

7. The adjustable bracket for the display device according to claim 6, wherein the support structure (210) comprises a back plate (211), both sides of the back plate (211) are respectively provided with hitching grooves (211A) disposed obliquely from front to back and from top to bottom and limiting grooves (211B) disposed along the front-rear direction, the adjusting structure (220) comprises a first adjuster (221), a second adjuster (223) and a third adjuster (225), the first adjuster (221) is provided with a first rotation shaft (222), the back plate (211) is rotatably hitched on the first rotation shaft (222) through the hitching grooves (211A), and a locking member (211C) is disposed between the first adjuster (221) and the back plate (211), the locking member (211C) is fitted in the limiting groove (211B), and a central axis of the first rotation shaft (222) is the first axis of rotation; the second adjuster (223) is disposed on a back side of the first adjuster (221) and is rotatably connected with the first adjuster (221) through a vertically disposed second rotation shaft (224), and a central axis of the second rotation shaft (224) is the second axis of rotation; and the third adjuster (225) is located on the back side of the second adjuster (223), the third adjuster (225) is provided with at least two second chutes (227) distributed about the third axis of rotation, the second adjuster (223) is provided with a plurality of second connectors (228) which are fitted in the second chute (227) in one-to-one correspondence, the third adjuster (225) and the second adjuster (223) relatively rotate about the third axis of rotation through a one-to-one sliding connection between the second connectors (228) and the second chutes (227).

8. The adjustable bracket for the display device according to claim 7, wherein the connecting arm (300) comprises a first connecting arm (310) and a second connecting arm (320) located below the first connecting arm (310), the third adjuster (225) is also provided with a third rotation shaft (226) and a fourth rotation shaft (229) disposed in the left-right direction, and the fourth rotation shaft (229) is located below the third rotation shaft (226), end portions, corresponding to each other, of the first connecting arm (310) and the second connecting arm (320) are rotatably connected with the third adjuster (225) through the third rotation shaft (226) and the fourth rotation shaft (229), respectively, and the other end portions, corresponding to each other, of the first connecting arm (310) and the second connecting arm (320) are rotatably connected to the housing (110), and the first connecting arm (310), the third adjuster (225), the second connecting arm (320) and the housing (110) together form a parallelogram; and the cable (120) is connected to the third rotation shaft (226).

9. The adjustable bracket for the display device according to claim 8, wherein a rotating wheel (400) is sleeved on the third rotation shaft (226), and the cable (120) is connected to the rotating wheel (400).

10. The adjustable bracket for the display device according to claim 8, wherein the support structure (210) further comprises at least two cross bars (212) respectively disposed through an upper portion and a lower portion of the back plate (211), first longitudinal bars (213) capable of being slidingly connected to opposing end portions of the at least two cross bars (212) in a horizontal direction, and a second longitudinal bar (214) connected to the cross bar (212) at the bottom and disposed in a vertical direction.

* * * * *